(12) United States Patent
Moe et al.

(10) Patent No.: US 9,661,535 B2
(45) Date of Patent: May 23, 2017

(54) SELF CONFIGURATION AND OPTIMIZATION OF CELL NEIGHBORS IN WIRELESS TELECOMMUNICATIONS

(71) Applicant: Unwired Planet, LLC, Reno, NV (US)

(72) Inventors: Johan Moe, Mantorp (SE); Harald Kallin, Sollentuna (SE)

(73) Assignee: Unwired Planet, LLC, Reno, NV (US)

( * ) Notice: Subject to any disclaimer, the term of this patent is extended or adjusted under 35 U.S.C. 154(b) by 95 days.

(21) Appl. No.: 14/817,459

(22) Filed: Aug. 4, 2015

(65) Prior Publication Data

US 2015/0373595 A1    Dec. 24, 2015

Related U.S. Application Data

(63) Continuation of application No. 13/746,155, filed on Jan. 21, 2013, now Pat. No. 9,432,889, which is a continuation of application No. 13/483,510, filed on May 30, 2012, now abandoned, which is a continuation of application No. 13/084,884, filed on Apr. 12, 2011, now Pat. No. 8,213,941, which is a continuation of application No. 11/773,752, filed on Jul. 5, 2007, now Pat. No. 7,957,743.

(51) Int. Cl.
| | |
|---|---|
| *H04W 36/00* | (2009.01) |
| *H04J 11/00* | (2006.01) |
| *H04W 16/00* | (2009.01) |
| *H04L 29/06* | (2006.01) |
| *H04W 24/08* | (2009.01) |
| *H04W 72/08* | (2009.01) |
| *H04W 36/08* | (2009.01) |

(52) U.S. Cl.
CPC ..... *H04W 36/0083* (2013.01); *H04J 11/0093* (2013.01); *H04L 65/4076* (2013.01); *H04W 16/00* (2013.01); *H04W 24/08* (2013.01); *H04W 36/0061* (2013.01); *H04W 72/085* (2013.01); *H04W 36/08* (2013.01)

(58) Field of Classification Search
CPC . H04W 36/0061; H04W 16/00; H04W 36/08; H04J 11/0093
USPC ..... 455/422.1, 450–455, 464, 509, 436–444; 370/339, 341–348, 431–463, 321–337
See application file for complete search history.

(56) References Cited

U.S. PATENT DOCUMENTS

| | | |
|---|---|---|
| 5,949,771 A | 9/1999 | De Clerck et al. |
| 6,044,272 A | 3/2000 | Kobylinski et al. |

(Continued)

FOREIGN PATENT DOCUMENTS

| | | |
|---|---|---|
| CN | 1191059 | 8/1998 |
| CN | 1857021 | 11/2006 |

(Continued)

OTHER PUBLICATIONS

ETSI TS 125 401 V3.3.0 Technical Specification, Universal Mobile Telecommunications System (UMTS); UTRAN Overall Description (3G TS 25.401 version 3.3.0 Release 1999) (Jun. 2000).

(Continued)

*Primary Examiner* — Ronald Eisner
(74) *Attorney, Agent, or Firm* — Nixon & Vanderhye P.C.

(57) ABSTRACT

The present invention aims to reduce the cost of planning and maintaining neighbor cell sets by requiring mobile terminals to make an additional effort to identify uniquely neighboring cells in the radio network.

20 Claims, 4 Drawing Sheets

(56) References Cited

U.S. PATENT DOCUMENTS

| | | | |
|---|---|---|---|
| 6,285,874 | B1 | 9/2001 | Magnusson et al. |
| 6,449,482 | B1 | 9/2002 | Johansson et al. |
| 6,556,829 | B1 | 4/2003 | Persson |
| 6,628,632 | B1 | 9/2003 | Dolan |
| 7,336,612 | B1 | 2/2008 | Khankhel |
| 7,701,899 | B2 | 4/2010 | Jansson |
| 7,957,743 | B2 | 6/2011 | Moe et al. |
| 8,213,941 | B2 | 7/2012 | Moe et al. |
| 8,559,952 | B2 | 10/2013 | Frenger et al. |
| 8,588,759 | B2 | 11/2013 | Moe et al. |
| 2002/0071403 | A1* | 6/2002 | Crowe ............... H04W 36/18 370/331 |
| 2003/0112821 | A1 | 6/2003 | Cleveland et al. |
| 2004/0063428 | A1* | 4/2004 | Jansson ............... H04W 48/12 455/434 |
| 2005/0009528 | A1 | 1/2005 | Iwamura et al. |
| 2005/0265279 | A1 | 12/2005 | Markovic et al. |
| 2005/0266853 | A1 | 12/2005 | Gallagher et al. |
| 2006/0002355 | A1 | 1/2006 | Baek et al. |
| 2006/0002365 | A1 | 1/2006 | Heino et al. |
| 2006/0040700 | A1 | 2/2006 | Roberts et al. |
| 2006/0056351 | A1 | 3/2006 | Wall |
| 2006/0189316 | A1 | 8/2006 | Kobylinski et al. |
| 2006/0234713 | A1 | 10/2006 | Oswal et al. |
| 2006/0240829 | A1 | 10/2006 | Hurst |
| 2007/0097938 | A1 | 5/2007 | Nylander et al. |
| 2007/0121549 | A1 | 5/2007 | Yun et al. |
| 2007/0135147 | A1 | 6/2007 | De Clerck et al. |
| 2007/0140163 | A1 | 6/2007 | Meier et al. |
| 2007/0142051 | A1 | 6/2007 | Xu et al. |
| 2007/0147377 | A1 | 6/2007 | Laroia et al. |
| 2007/0213086 | A1 | 9/2007 | Claussen et al. |
| 2007/0291770 | A1 | 12/2007 | Kitazoe |
| 2008/0159236 | A1 | 7/2008 | Ch'ng et al. |
| 2008/0207207 | A1 | 8/2008 | Moe et al. |
| 2009/0209261 | A1 | 8/2009 | Kuri et al. |
| 2009/0275319 | A1 | 11/2009 | Aoyama et al. |
| 2011/0188473 | A1 | 8/2011 | Moe et al. |
| 2012/0014309 | A1 | 1/2012 | Iizuka et al. |
| 2012/0082135 | A1 | 4/2012 | Palenius et al. |
| 2012/0302235 | A1 | 11/2012 | Moe et al. |
| 2013/0267233 | A1 | 10/2013 | Moe et al. |

FOREIGN PATENT DOCUMENTS

| | | |
|---|---|---|
| EP | 1 720 373 A1 | 11/2006 |
| GB | 2 331 892 A | 6/1999 |
| JP | 2003-188806 A | 7/2003 |
| JP | 2004-120622 A | 4/2004 |
| JP | 5448211 B2 | 1/2014 |
| WO | 96/38014 A1 | 11/1996 |
| WO | 99/17571 A1 | 4/1999 |
| WO | 99/27736 A1 | 6/1999 |
| WO | 02/43430 A1 | 5/2002 |
| WO | 2005/032190 A1 | 4/2005 |
| WO | 2005/101890 A1 | 10/2005 |
| WO | 2006/105618 A1 | 10/2006 |
| WO | 2006113051 | 10/2006 |
| WO | 2007/010304 A1 | 1/2007 |
| WO | 2007/015529 A1 | 2/2007 |
| WO | 2007/020997 A1 | 2/2007 |

OTHER PUBLICATIONS

3GPP TS 36.300 V0.5.0 Technical Specification, 3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8) (Feb. 2007).
ETSI TR 125 933 V5.4.0 Technical Report; Universal Mobile Telecommunications System (UMTS); IP Transport in UTRAN (3GPP TR 25.933 version 5.4.0 Release 5) (Dec. 2003).
ETSI TS 125 133 V7.5.0 Technical Specification; Universal Mobile Telecommunications System (UMTS); Requirements for Support of Radio Resource Management (FDD) (3GPP TS 25.133 version 7.5.0 Release 7) (Oct. 2006).
RP-030375 Overview of 3GPP Release 5—Summary of all Release 5 Features—Version 0.10, Jun. 4-6, 2003.
IEEE Standard 802.15.3™—2003, IEEE Standard for Information Technology—Telecommunications and Information Exchange Between systems—Local and Metropolitan Area Networks—Specific Requirements; Part 15.3: Wireless Medium Access Control (MAC) and Physical Layer (PHY) Specifications for High Rate Wireless Personal Area Networks (WPANs).
R3-061737, 3GPP TSG RAN WG3 meeting #54, T-Mobile, "Self Configuration & Self Optimization Use Cases", Nov. 6-11, 2006, Riga, Latvia.
R3-061758, 3GPP TSG-RAN WG3 Meeting #54, Nokia, "Self-Configuration and Self-Optimization of Neighbor Cell Lists", Riga, Latvia, Nov. 6-10, 2006.
TSGR3#54(11) R3-070322, TSG-RAN Working Group 3 meeting #54, MCC, "Final report of 3GPP TSG RAN WG3 meeting 54", Riga, Latvia, Nov. 6-10, 2006.
S5-070207, 3GPP TSG-SA5 (Telecom Management) Meeting SA5#51, T-Mobile, "Self Configuration & Self Optimization Use Cases", Jan. 22-26, 2007, Seville, ES.
S5-061651, TSG#33(06)0753, Technical Specification Group Services and System Aspects, Meeting #34, SA5 (Telecom Management), "WID Study of Management for LTE and SAE", Dec. 4-7, 2006, Budapest, Hungary.
Shim et al, "Low Latency Handoff for Wireless IP QOS with NeighborCasting", IEEE International Conference on Communications, ICC 2002, vol. 5, 2002, pp. 3245-3249.
3GPP TSG RAN WG2 #54, R2-062174, NTT DoCoMo, Inc., "Standardisation Policy for Plug and Play RAN", Tallinn, Estoria, Aug. 28-Sep. 1, 2006.
3GPP TSG RAN WG2 Meeting #54, R2-062156, Motorola, T-Mobile, "Measurements for Network Optimization", Tallinn, Estoria, Aug. 28-Sep. 1, 2006.
3GPP TSG RAN WG2#53, R2-061545, T-Mobile, KPN, "Complexity Minimisation to Setup and Optimise an LTE Network", Shanghai, China, May 8-12, 2006.
3GPP TSG RAN WG2#53, R2-062303, Qualcomm Europe, "Discovery of Neighbour Cells in E-UTRAN", Tallinn, Estoria, Aug. 28-Sep. 1, 2006.
3GPP TSG RAN WG3#53bis, R3-061488, T-Mobile, "Impact of Self-Configuration and Self-Optimisation Functionality on Architecture & Interfaces", Seoul, South Korea, Oct. 10-13, 2006.
3GPP TSG RAN WG2#56, R2-063076, Nokia, "Control of UE Measurements for Network Self-configuration and Optimization", Riga, Latvia, Nov. 6-10, 2006.
3GPP TSG RAN WG2#54, T-Mobile, "Support for Self-Configuration and Self-Optimisation Proposal for Stage2", Tallinn, Estoria, Aug. 28-Sep. 1, 2006.
3GPP TR 25.814 V7.1.0, Technical Specification Group Radio Access Network; Physical layer aspects for evolved Universal Terrestrial Radio Access (UTRA) (Release 7) (Sep. 2006).
3GPP TSG-S1 #6, S1-(99)906, "Concept Proposal for EGPRS-136",y Sophia Antipolis France, Nov. 22-26, 1999.
EP Submission in Opposition Proceedings mailed Aug. 19, 2015 in EP Application 12159399.0.
Wang, "A Dynamic Resource Allocation for Vertical Handoff on Heterogeneous Wireless Networks", Thesis for the Degree of Master, Chaoyang University of Technology, Department of Information Management, Jun. 16, 2003.
Canadian Intellectual Property Office, "Office Action," issued in connection with Canadian Patent Application No. 2,593,524, dated May 20, 2014.
Canadian Intellectual Property Office, "Office Action," issued in connection with Canadian Patent Application No. 2,593,524, dated Sep. 25, 2014.
State Intellectual Property Office, P.R. China, "First Office Action," issued in connection with Chinese Patent Application No. 201310190069.0, dated Jun. 19, 2015.

(56) References Cited

OTHER PUBLICATIONS

R2-070403 3GPP TS 36.300 V0.4.0 "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" (Jan. 2007).
Exam Report issued in Opposition Proceedings on EP patent EP2119287 (App. No. 07711716.6), dated Dec. 23, 2015.
Exam Report issued in Opposition Proceedings on EP patent EP2485514 (App. No. 12159399.0), dated Feb. 15, 2016.
3GPP-RAN-WG2 Meeting #4, R2-001416, Change Request, Paris, France Jul. 3-7, 2000.
Samsung Judgment in Germany for European patent EP2119287 (Decision 4b O 122.14), dated Jan. 19, 2016.
Samsung Judgment in Germany for European patent EP2485514 (Decision 4b O 123.14), dated Jan. 19, 2016.
Samsung/Huawei Judgment in the UK for European patents EP2119287 and EP2485514, dated Jan. 29, 2016.
R2-070674, 3GPP TSG-RAN WG2 Meeting #57, Samsung, "Transmission of time critical system information", St. Louis, USA, Feb. 12-16, 2007.
3GPP TS 25.331 v3.6.0, Technical Specification; 3$^{rd}$ Generation Partnership Project; Technical Specification Group Radio Access Network; RRC Protocol Specification (Release (1999) (Mar. 2001).
ETSI TS 25.331 v7.3.0, Technical Specification; Universal Mobile Telecommunications System (UMTS); Radio Resource Control (RRC); Protocol Specification (3GPP TS 25.331 version 7.3.0 Release 7) (Dec. 2006).
R2-061987, 3GPP TSG RAN WG2#Ad Hoc on LTE, LG Electronics Inc., "Neighbouring Cell Organisation", Cannes, France, Jun. 27-30, 2006.
R2-070200, 3GPP TSG RAN WG2 #57, LG Electronics Inc., "Reduction of Size of Neighbouring Cell List", Sorrento, Italy, Jan. 15-19, 2007.
R2-062230, 3GPP TSG RAN WG2 #54, Lucent Technologies, T-Mobile, "Discussion on Auto-configuration and Dynamic Optimization", Tallinn, Estonia, Aug. 28-Sep. 1, 2006.
R2-070087, 3GPP TSG RAN WG2 #56bis, Panasonic, "Necessity of Neighbour Cell List", Jan. 15-19, 2006, Sorrento, Italy.
R2-061971, TSG-RAN Working Group 2 #53bis, NEC, "Traffic Volume Measurement and Activity Level Control", Cannes, France, Jun. 27-30, 2006.
TEMS Training Presentation, Jakarta, Dec. 18, 2006.
ETSI TS 100 908 V8.11.0, Technical Specification, Digital Cellular Telecommunications System (Phase 2+); Multiplexing and Multiple Access on the Radio Path (3GPP TS 05.02 version 8.11.0 Release 1999) (Jun. 2003).
ETSI TS 125 213 V6.5.0, Technical Specification, Universal Mobile Telecommunications System (UMTS); Spreading and Modulation (FDD) (3GPP TS 25.213 Version 6.5.0 Release 6) (Mar. 2006).
ETSI TS 125 214 V6.11.0, Technical Specification, Universal Mobile Telecommunications System (UMTS); Physical Lager Procedures (FDD) (3GPP TS 25.214 Version 6.11.0 Release 6) (Dec. 2006).
ETSI TS 125 331 V3.5.0, Technical Specification, Universal Mobile Telecommunications System (UMTS); RRC Protocol Specification 3GPP TS 25.331 Version 3.5.0 Release 1999) (Dec. 2000).
TS GR2#8(99)e62, TSG-RAN Working Group 2 (Radio layer 2 and Radio layer 3), Document D11, Ericsson, Additional Measurements in RRC Measurement Messages, Cheju, Korea.
ETSI TS 125 331 V5.19.0, Technical Specification, Universal Mobile Telecommunications System (UMTS); Radio Resource Control (RRC); Protocol Specification (3GPP TS 25.331 Version 5.19.0 Release 5) (Dec. 2006).
ETSI TS 125.401 V3.3.0, Technical Specification, Universal Mobile Telecommunications System (UMTS); UTRAN Overall Description (3G TS 25.401 Version 3.3.0 Release 1999) (Jun. 2000).
Tdoc R2-010593, 3GPP TSG-RAN-WG2 Meeting #19, Change Request, "Measurement Related Corrections", Sophia Antipolis, France, Feb. 19-23, 2001, CR p. 1-CR p. 3.
3GPP TS 25.212 version 6.10.0 Release 6, ETSI TS 125 212 V6.10.0 (Dec. 2006), p. 49.
R2-001768, 3GPP-RAN-WG2 Meeting #15, Change Request, "Cell Identity", Sophia Antipolis, France, Aug. 21-25, 2000; cover page and page with section 8.5.7.7x.
EP Communication mailed Jul. 6, 2015 is EP Application 07711716.6.
Betten & Resch Jun. 26, 2015 letter re EP2119287 (85 pages).
Gustås et al, "Real-Time Performance Monitoring and Optimization of Cellular Systems", Ericsson Review No. 1, 2002.
3G TS 25.331 V3.3.0 Technical Specification, 3$^{rd}$ Generation Partnership Project; Technical Specification Group Radio Access Network; RRC Protocol Specification (Release 1999) (Jun. 2000).
3G TS 25.331 V3.4.0 Technical Specification, 3$^{rd}$ Generation Partnership Project; Technical Specification Group Radio Access Network; RRC Protocol Specification (Release 1999) (Sep. 2000).
ETSI TS 125 331 V3.4.1 Technical Specification, Universal Mobile Telecommunications System (UMTS); RRC Protocol Specification (3GPP TS 25.331 version 3.4.1 Release 1999) (Sep. 2000).
Summons to attend oral proceedings pursuant to Rule 115(1) EPC mail Mar. 23, 2017 in EP Application 07711716.6.
Preliminary Opinion mailed Mar. 23, 2017 in EP Application 07711716.6.

* cited by examiner

SELF CONFIGURATION AND OPTIMIZATION OF CELL NEIGHBORS IN WIRELESS TELECOMMUNICATIONS

CROSS-REFERENCE TO RELATED APPLICATIONS

This application is a continuation of U.S. application Ser. No. 13/476,155, filed Jan. 21, 2013, which is a continuation of U.S. application Ser. No. 13/483,510, filed May 30, 2012, which is a continuation of U.S. application Ser. No. 13/084,884, filed Apr. 12, 2011, which is a continuation of U.S. application Ser. No. 11/773,752, filed on Jul. 5, 2007, which claims the benefit of International Application No. PCT/EP2007/01737, filed Feb. 28, 2007, the disclosures of which are incorporated herein by reference.

FIELD OF INVENTION

The present invention relates to self-configuring and optimisation of cell neighbours in wireless telecommunications networks.

BACKGROUND OF THE INVENTION

Figure 1:
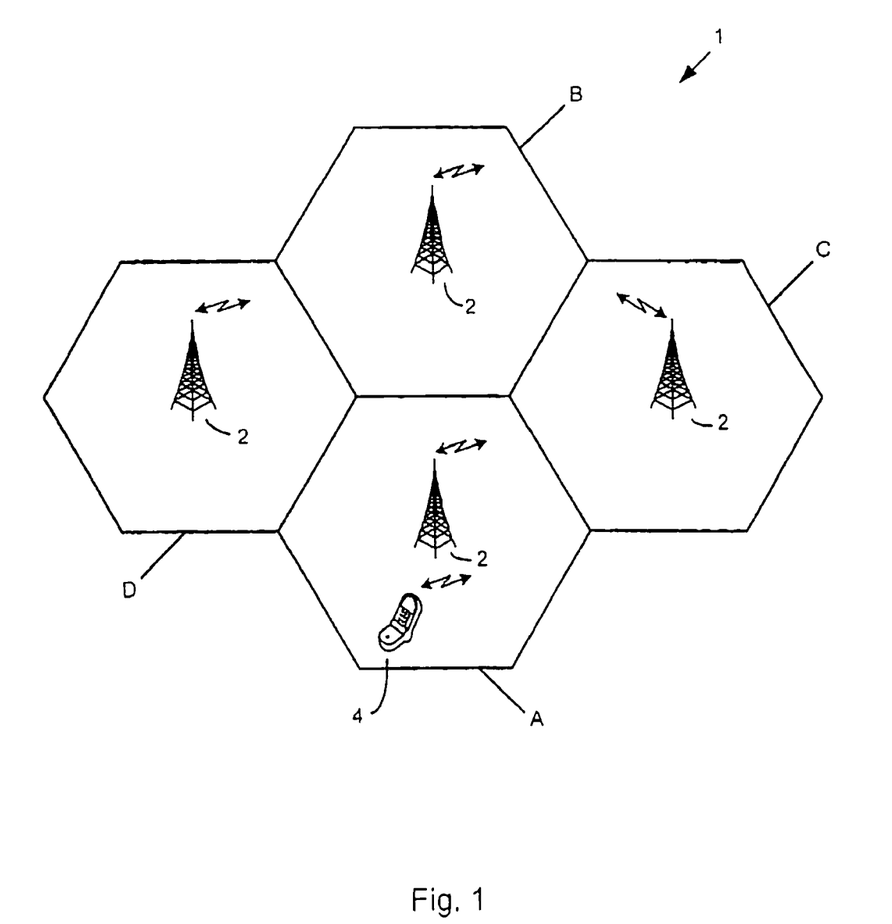
FIG. 1 illustrates a cellular wireless telecommunications network.

FIG. 1 of the accompanying drawings illustrates a wireless telecommunications network, which support communication with terminals in a number of cells (A, B, C, D) each of which is served by a radio base station 2. Each communication cell covers a geographical area, and by combining a number of cells a wide area can be covered. A mobile terminal 4 is illustrated communicating in cell A, and is able to move around the system 1.

A base station 2 contains a number of receivers and transmitters to give radio coverage for one or more cells. Each base station 2 is connected to a network "backbone", or core network infrastructure (not shown), which enables communications between base stations and other networks. The example system of FIG. 1 shows one base station per cell.

An important concept in such a network is the cell and its neighbours. During a call a mobile terminal 4 typically is moved in the geography, and when so doing leaves a first cell and enters a new cell that neighbours the first cell. The cell may be changed several times and the process of changing the cell that supports a radio link with the terminal is called handover. A list of the known neighbours, the so called "neighbour cell set", is important both for the network 1 and for the mobile terminal 4 to enable reliable handover between cells. The network 1 can store information relating to a set of neighbour cells for each cell in the system. Evaluation of the best cell for supporting a radio link with the mobile terminal is based upon measurements made by the terminal on the serving cell and on other cells than the serving cell. The neighbour cell list is needed for mapping measurements and handover decisions to a target cell identity and possibly applying specific parameters or rules for the target cell. It will be readily appreciated that the cell boundaries are not sharply defined, but will in practice be somewhat blurred as the range of the base stations will overlap with one another.

In existing systems, the mobile terminal, 4, detects and measures cell operating parameters for neighbouring cells by measuring on their broadcast channels. One measured operating parameter is a cell non-unique identifier which typically consists of a physical layer identifier such as a scramble code which is non uniquely assigned to the cell. Operating parameters also relates to the signal quality of the neighbour cell such as signal strength, signal quality and timing information. When the quality of a neighbour cell is considered better than the current serving cell, a handover from the serving cell to the chosen neighbour cell is executed by the network. The neighbour cell then becomes the serving cell for the mobile terminal.

Typically in a WCDMA (wideband code division multiple access) system, the mobile terminal detects Common Pilot Channel (CPICH) transmissions from surrounding cells, in order to determine id (scramble code) and timing information.

When the mobile reports the neighbour cell signal quality measurements to the network, the cells' respective identities become important. Typically, cell identities are reused for more than one cell. The reuse of identities means that cells may be confused with one other, since the serving cell may have neighbour cells sharing the same identity information.

In the cells are also broadcasted unique cell identities. The unique cell identity is carried on the network layer. Its main use is for special purpose terminals, that are used by an operator of the system for testing and tracing of problems in the network. The unique cell identity is not repeated as often as the non-unique cell identity and is more complicated for a terminal to detect. This is in contrast to the physical layer, that is physical data needed for supporting the radio link.

Since the cells' physical layer identifiers are non-unique, populating and maintaining the neighbour cell sets can never be fully automatic. Human efforts are needed to resolve conflicts where the serving cell has multiple neighbours using the same non-unique identifier. A further problem is handover failures owing to the candidate cell has been incorrectly identified.

SUMMARY OF THE PRESENT INVENTION

The aim of the present invention is to secure handovers to be performed to the right cell. It solves the problem with a method for a radio base station or for a node controlling a radio base station serving a first cell and comprises the steps of, receiving from a terminal a non-unique cell identity of a second cell and a measure on the quality of the second cell, determining if the second cell can be unambiguously identified by the information in a neighbour cell list, and if ambiguity in the second cell identity is determined, ordering the terminal to identifying and reporting on the unique second cell identity, and associating the non-unique identity with the unique identity.

In a first embodiment ambiguity on the second cell identity is identified if the non-unique cell identity is not included in the neighbour cell list. The association is then made by including the second cell non-unique cell identity and the unique cell identity in the neighbour cell list. In a second embodiment ambiguity on the second cell identity arises if two unique cell identities in the neighbour cell list have the same non-unique identity. The association with the unique cell identity with the non-unique cell identity is then made for the specific radio link with the terminal for a period. The period is typically started with the signal strength of the second cell exceeded a predefined threshold value, and ending when a handover is performed or the second cell signal strength decreases under a second threshold value.

The invention also relates to a radio base stations or a node controlling radio base stations and that is adapted for performing the method.

The invention also includes a method for mobile stations that measures the signal quality on broadcast channels in other cells than the first cell, detects the non unique cell identity on broadcast channels with a quality exceeding a threshold value, transmitting information on the signal quality and second cell non-unique identity to the serving cell and upon receiving a command, detecting the unique cell identity on a broadcast channel and transmitting the unique cell identity.

The invention further relates to a mobile station adapted for performing the method.

An advantage of the present invention is that creation and or updating of a neighbour cell list can be made automatically by the system based on the measurements and cell identity information received from the terminals. Thereby, it is not necessary for humans to plan and maintain the neighbour cell lists.

DETAILED DESCRIPTION OF THE PREFERRED EMBODIMENTS

The basic problem of the present invention is to make a positive identification of a neighbouring cell that is ambiguously detected by a mobile terminal. The ambiguity may arise when a cell, not previously detected, is reported by a mobile terminal, or when two or more cells share the same non-unique cell identity and the two cells. An ambiguity will then arise on what cell that has been measured.

The problem exists in several systems, for example GSM, WCDMA and eUTRAN. In GSM and WCDMA a list of neighbour cells is created for each cell in the system by a human or at least controlled by a human. In so doing any collisions in the non-unique cell identities of the neighbours should be detected and possibly solved by reallocating the non-unique cell identities. It is cumbersome to establish and update the NCL (neighbour cell list) and the allocations of non-unique cell identities, especially when the capacity of a network is increased by the addition of further cells.

For WCDMA and eUTRAN it is desired that the NCL can, if not be completely created automatically, at least be updated automatically by the system based on measurements made by terminals on cells other than the cell serving the terminal. For that reason the present inventions is in particular important for the WCDMA and eUTRA, however, it may well be implemented also in other systems such as the GSM.

The inventions will primarily be implemented in a network node that handles the NCL and decides on handovers. In the eUTRAN this is the task of the eNodeB which is a base station, in the GSM it is the BSC (Base Station Controller) and in the WCDMA it is the RNC (Radio Network Controller) that handles the NCL. Both the BSC and the RNC have the functions of controlling the base stations and their operation on the various cells of the networks, and the term base station controller in this application refers to a node having the functions of the BSC or the RNC.

Figure 2:
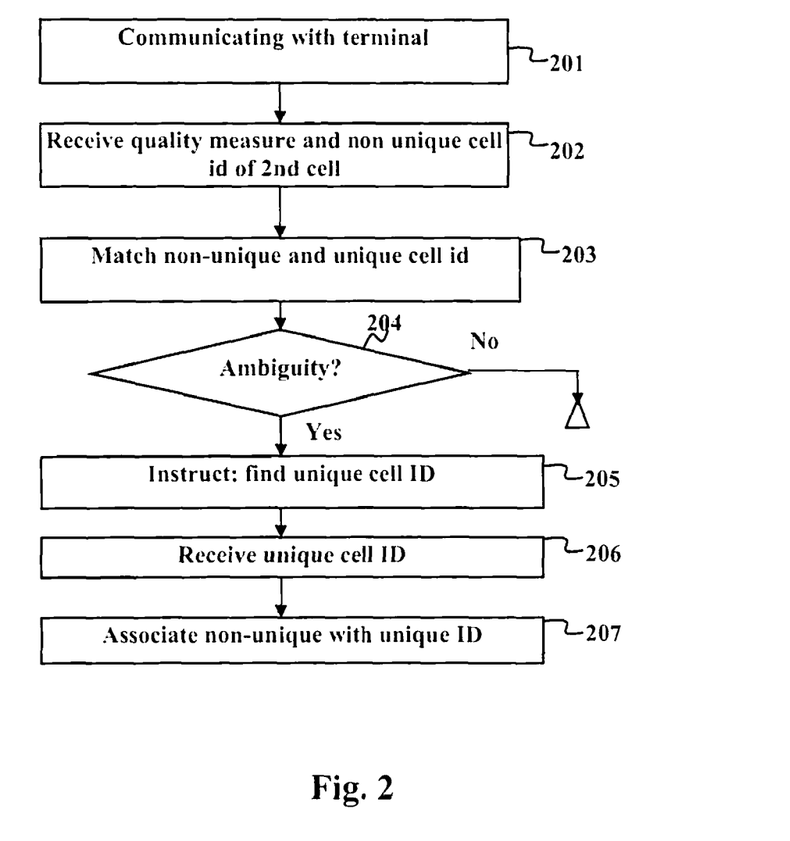
FIG. 2 illustrate steps of method for a base station or a base station controller.

FIG. 2 is a flow chart of the steps performed by a radio base station, 2, or a base station controller. For facilitating the description only the base station, 2, is mentioned when describing the method. It should be understood that the steps are alternatively carried out by the base station controller. In the first step 201 a communications link with a terminal, 4, in a first cell is supported. The base station receives; see step 202, a report from the terminal on a quality measure and a non-unique cell identity of a second cell. Next, 203, the base station retrieves the NCL to match the non-unique cell identity with a unique cell identity. If, see step 204, the match is made without any ambiguity the method is ended with respect to the second cell. If however ambiguity arises in the match, the base station instructs, 205, the terminal to detect the unique cell identity of the second cell. The base station receives the unique cell identity, 206, and in a last step, 207, the non-unique cell identity is associated with the unique cell identity within the NCL.

There are several reasons why the ambiguity may arise in the match between non-unique cell identity and the unique cell identity. The first, and basic reason is the second cell is not included in the NCL. Another reason is the NCL includes an indicator of suspected ambiguity. The indicator may have been added to the NCL prior to the method is being performed. The reason may be handovers to the identified cell have failed. The failure may be detected as terminals have re-established contact with the first cell as serving cell during handover processes, or the target cell has not sent notification to the first cell as serving cell. A further reason for ambiguity is two or more unique cell identities share the same non-unique cell identity.

If the reason for the ambiguity is that the second cell with its unique and non unique cell identities is not included in the NCL they are added to it in the last associating step, 207.

The base station frequently receives, 202, reports from the terminal on measures made on other cells, and then not only the second cell. When the base station has received, 206, the second cell unique identity as detected by the terminal it shall not instruct the terminal to detect the second cell unique identity when again receiving, 202, a quality measure from the terminal, not even if the ambiguity in the NCL is maintained. Therefore, the associating step, 207, shall associate the unique cell identity with the non-unique cell identity for this particular terminal for a specific period or as long as the signal quality of the second cell exceeds a predefined threshold. The association with the particular terminal is not made in the NCL, instead a temporary NCL is used.

As long as the second cell unique cell identity is associated with the terminal, if handover to the second cell is decided it will be directed via the associated second cell unique identity. Thereby the second cell will be instructed to prepare a handover of the terminal, before the terminal itself is instructed to make a handover to the second cell.

In addition to the requirement of ambiguity in the match of unique cell identity to the non-unique cell identity, the further requirement of the second cell quality measure exceeding a threshold value can be added before the terminal is instructed to detect the second cell unique identity. The reason for adding the further requirement is to avoid expense of the terminal performing the detection. The unique cell identity is transmitted from base stations at a much less frequent interval than the physical layer identity. In order to receive and decode this information, the mobile terminal 4 may have to shortly interrupt its communication with the serving cell.

Moreover, some filtering of the measurement data may be needed before the second cell is added to the NCL in the associating step 207. For example the second cell is not included until it has been reported by two or more mobile terminals. Thereby avoiding adding a distant cell that was detected under exceptional propagation conditions, for example from a mobile terminal 4 located in an aircraft.

Additionally in step 207, cell lookup maps the unique cell identity (UCID) to the address of the realising node of that cell. For example, in LTE, this can be an ordinary DNS, mapping the cell identity to an IP address. The IP address in turn points to the RBS realising the cell.

Figure 3:
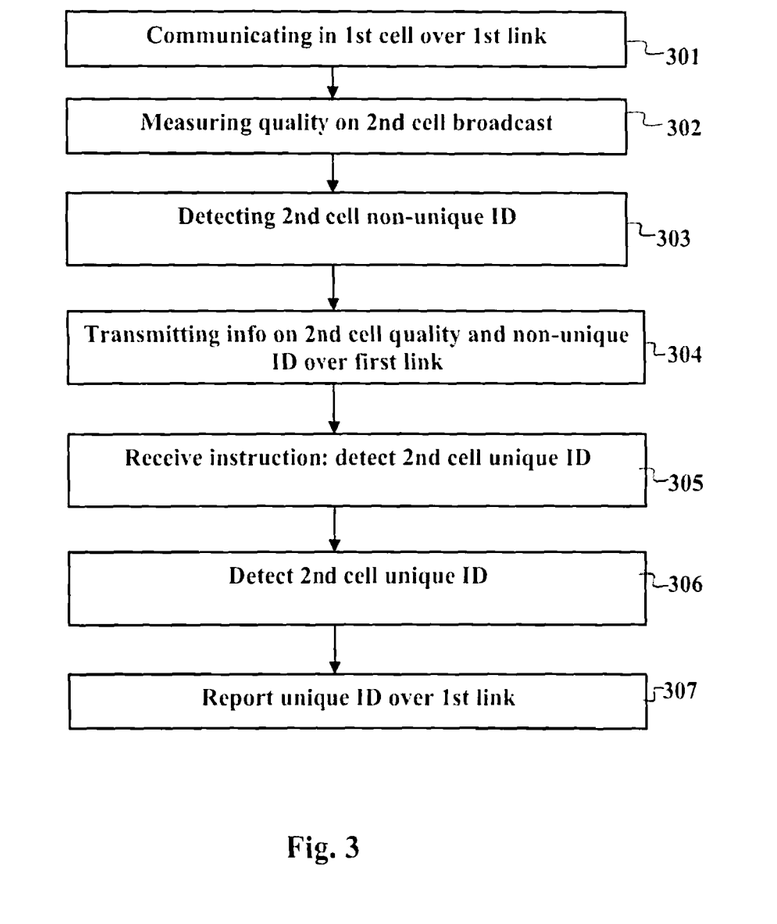
FIG. 3 illustrate steps of a method for a terminal.

FIG. 3 is a flowchart of the steps to be performed by a mobile terminal. In a first step 301, the terminal is in communication with the first cell over a first radio link. In the next step, 302, the terminal measures the quality of a broadcast channel transmitted in a second cell, and detects, 303, the second cell non-unique identity as sent on layer 1 communication. In a fourth step, 304, the terminal transmits the second cell non-unique identity, and quality measure over the first radio link. The quality measure and the non-unique identity are tied together in the transmission. In a following step, 305, the terminal receives an instruction over the first radio link to detect the second cell unique identity. Next, 306, the terminal detects the second cell unique identity as broadcasted on network layer. In the last step, 307, the terminal transmits the second cell unique identity over the first radio link.

The terminal 4 scans the spectrum to find broadcast channels of potential neighbour cells. The ability to detect and measure a broadcast channel depends on the sensitivity of the hardware in the terminal transceiver and of the broadcast channel power relative to the interference level. A further prerequisite for detecting the second cell identity of the potential neighbour cell in step 303 may be added, and that be the broadcast channel reception quality as detected in step 302, exceeds a threshold value. If the non-unique cell identity is not detected, the second cell is of course not informed to the network, in step 304.

Figures 4A, 4B:
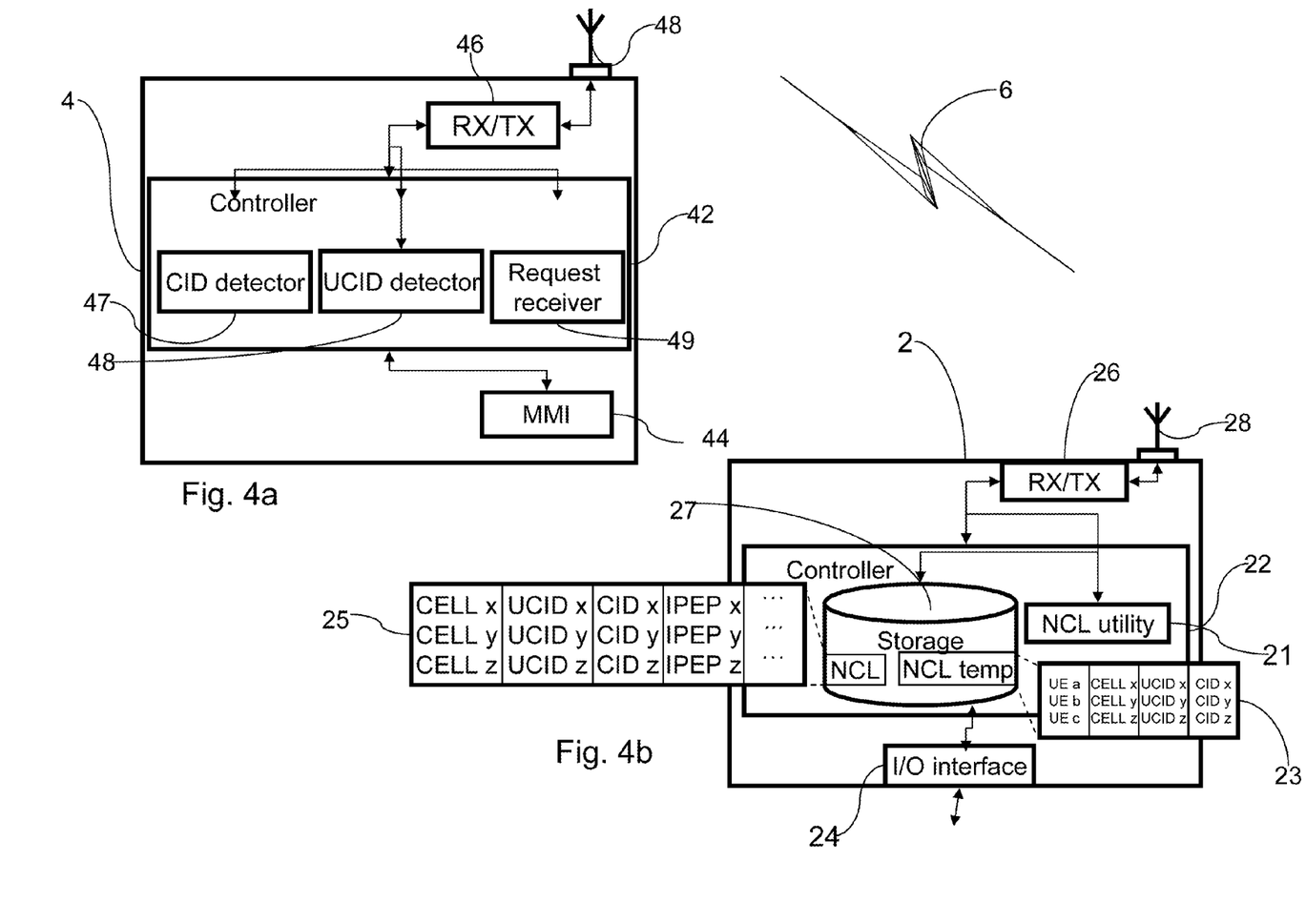
FIG. 4a is a block diagram of a mobile terminal.
FIG. 4b is a block diagram of a base station.

FIG. 4a is a block diagram of parts of a mobile terminal 4 that are essential for the present invention. The mobile terminal 4 comprises a controller 42, a man machine interface (MMI) 44, a radio transceiver 46, and an antenna 48. The controller 42 of the mobile terminal 4 serves to control communications with the base station 2 via the transceiver 46 and antenna 48, over the air interface 6. This means the controller 42 have the function of receiving control messages from the base station, and control the operation of the mobile terminal in accordance with the control messages. Data detected by the transceiver passes through controller 42. The controller reads control information on the physical layer. With respect to measures on other cells than the serving cell the controller 42 receives the measures on the reception quality and identifies the non-unique cell identity. The controller further collects measures and the associated non-unique cell identities and reports to the radio base stations regularly. The controller is equipped with a CID (cell identity) detector 47 for identifying the non-unique cell identity in the physical layer information. The terminal blocks and functioning so far described are the same as for prior art terminals 4. However, the functioning of the controller is adapted for the present invention. The controller has a request receiver 49, arranged for detecting a control message from the serving base station on identifying the unique cell identity of a cell of a non-unique cell identity. When such a request has been received, the controller 42, controls the transceiver 46 to detect data on the second cell broadcast channel, until the unique cell identity has been identified. The controller 42 is equipped with a UCID detector that reads the information on the network layer, as received from the transceiver. The controller 42 controls the transceiver to continue detecting data on the broadcast channel until the UCID detector has found the unique cell identity. Owing to the unique cell identity is repeated with long intervals, the identification of the unique cell identity requires the transceiver to detect the broadcast channel longer time than if just then non-unique identity need be detected.

The CID detector 47, the UCID detector 48, and the request receiver 49 are preferably implemented as SW modules, however, they may alternatively be implemented in hardware or in a combination of the two.

Interactions with the user of the device take place using the man machine interface 44, which can include a key pad, microphone, loudspeaker and display device, for example.

FIG. 4b is a block diagram of a base station 2 which communicate via an air interface 6. Only blocks essential for the present invention are disclosed. The base station 2 includes an input/output (I/O) interface 24, a radio transceiver 26 an antenna 28 and a controller 22. The controller communicates with mobile terminals via the transceiver 26 and antenna 28 over the air interface 6. The controller 22 also communicates with the rest of the telecommunications network via the I/O interface 24. For this invention the controller also includes NCL utility, 21, a storage device, 27, a temporary NCL, 23, and a NCL, 25. The controller retrieves the NCL for identifying the unique cell identifiers for the non-unique cell identifiers reported by the terminals. These aspects of the base station are designed to operate in accordance with usual practice. The NCL unit monitors if the match between non-unique and unique cell identity can be made without ambiguity. If ambiguity exist the NCL unity initiates an instruction is sent to the terminal for it to report of the unique cell identity of the non-uniquely identified cell. When the unique cell identity is reported by the terminal, the NCL utility 22 controls the unique and the non-unique cell identity are listed and associated with the terminal identity in the temporary NCL. A further condition for listing in the temporary NCL is the reported reception quality is above a first threshold level. The NCL utility 22 also controls the non-relevant association to be deleted. Typically this is made when the signal strength of a cell on the temporary NCL has decreased under a second threshold level. Alternatively the data base 27 with NCL and temporary NCL are located outside the controller and connected to it.

Typically the controller will also decide on handovers from the serving base station to a target base station serving the second cell, or which of the other cells that temporary will function as second cell.

In an alternative to the base station described with reference to FIG. 4b, the controller 22 is located in a radio network controller. The radio network controller with internal controller is then connected to at least one radio base station transceiver. The functioning of the internal controller 22 will then be the same as described in connection to the radio base station.

However, base stations 2 and mobile terminals 4 which operate in accordance with the present invention are adapted to carry out the method of the invention as described below with reference to FIGS. 3 to 6. It will be appreciated that the various functional units can be provided by the controller 42, 22, or by other specific units in the devices, or network 1.

Making use of unique cell identifiers (UCID) means that there is unambiguous information relating to the identity of the neighbour cells, and so confusion regarding those neighbouring cells is removed. Using the fast and low-resource demanding non-unique cell identity for most of the measurements, facilitates efficient resource usage within mobile terminals 4 and rapid handover to the neighbour cells. The mobile terminal 4 is only requested to retrieve the more cumbersome unique cell identifier when a new neighbour is detected, or when an audit of the relation between the non-unique and unique cell identity seems appropriate.

All cell relations can be continuously evaluated. Inputs to that evaluation are mobile terminal reports and events, network events and operator input. The result of the evaluation is that the cell or cell relations will retain different properties. This can also be seen as the cell relation being in different states.

The major advantage of embodiments of the present invention is that it removes the need for manual involvement within the process of maintaining neighbour sets. The operator can decide to fully neglect the concept of neighbours and let the system take care of the neighbour cell definitions.

The invention claimed is:

1. A method in a mobile terminal for facilitating the updating of a neighbor cell list associated with a first cell of a wireless telecommunications network, said list containing elements that identify other cells that have a neighbor cell relationship with the first cell, the method comprising the steps of:
   engaging in communication with a radio base station serving the first cell;
   while in communication with the serving radio base station, identifying a non-unique cell identity based on signals broadcast by a radio base station in a second cell;
   measuring a signal quality of signals broadcast in the second cell;
   reporting, to the serving radio base station, the identified non-unique cell identity and the signal quality;
   receiving, from the serving radio base station, an instruction to detect the unique cell identity of the second cell;
   interrupting the communication with the serving radio base station to receive further signals broadcast in the second cell in order to identify a unique cell identity of the second cell;
   identifying the unique cell identity based on the further signals broadcast in the second cell; and
   reporting the unique cell identity to the serving radio base station.

2. The method of claim 1, wherein the further signals comprise data broadcast in the second cell, and identifying the unique cell identity comprises receiving and decoding the data.

3. The method of claim 1, wherein the unique cell identity is broadcast less frequently than the non-unique cell identity in the second cell.

4. The method of claim 1, wherein:
   identifying the non-unique cell identity based on signals broadcast in the second cell requires the mobile terminal to detect the signals for a first time period;
   identifying the unique cell identity based on the further signals broadcast in the second cell requires the mobile terminal to detect the further signals for a second time period; and
   the second time period is longer than the first time period.

5. The method of claim 1, wherein:
   the non-unique cell identity is detected in a first layer carrying physical information; and
   the unique cell identity is detected in a network layer.

6. The method of claim 1, wherein the signal quality comprises one or more of a signal strength measurement, a signal quality measurement, and timing information.

7. The method of claim 1, wherein the reported unique cell identity of the second cell enables the serving radio base station to look up an IP address of the radio base station serving the second cell.

8. The method of claim 1, wherein the mobile terminal is an LTE mobile terminal.

9. A mobile terminal for assisting in the updating of a neighbor cell list associated with a first cell of a wireless telecommunications network, said list containing elements that identify other cells that have a neighbor cell relationship with the first cell, the mobile terminal comprising:
   a radio transceiver; and
   a controller coupled to the radio transceiver and configured to, via the radio transceiver:
      engage in communication with a radio base station serving the first cell;
      while in communication with the serving radio base station, identify a non-unique cell identity based on signals broadcast by a radio base station in a second cell;
      measure a signal quality of signals broadcast in the second cell;
      report, to the serving radio base station, the identified non-unique cell identity and the signal quality;
      receive, from the serving radio base station, an instruction to detect the unique cell identity of the second cell;
      interrupt the communication with the serving radio base stations to receive further signals broadcast in the second cell in order to identify a unique cell identity of the second cell;
      identify the unique cell identity based on further signals broadcast in the second cell; and
      report the unique cell identity to the serving radio base station.

10. The mobile terminal of claim 9, wherein the further signals comprise data broadcast in the second cell, and the controller is configured to identify the unique cell identity by receiving and decoding the data.

11. The mobile terminal of claim 9, wherein the unique cell identity is broadcast less frequently than the non-unique cell identity in the second cell.

12. The mobile terminal of claim 9, wherein:
   identifying the non-unique cell identity based on signals broadcast in the second cell requires the mobile terminal to detect the signals for a first time period;
   identifying the unique cell identity based on the further signals broadcast in the second cell requires the mobile terminal to detect the further signals for a second time period; and
   the second time period is longer than the first time period.

13. The mobile terminal of claim 9, wherein the controller includes a cell identity (CID) detector for identifying the non-unique cell identity.

14. The mobile terminal of claim 9, wherein the controller includes a unique CID (UCID) detector for identifying the unique cell identity.

15. The mobile terminal of claim 9, wherein the non-unique cell identity is detected in a first layer carrying physical information.

16. The mobile terminal of claim 15, wherein the unique cell identity is detected in a second layer higher than the first layer.

17. The mobile terminal of claim 16, wherein the second layer is a network layer.

18. The mobile terminal of claim 9, wherein the signal quality comprises one or more of a signal strength measurement, a signal quality measurement, and timing information.

19. The mobile terminal of claim 9, wherein the reported unique cell identity of the second cell enables the serving radio base station to look up an IP address of a second radio base station that serves the second cell.

20. The mobile terminal of claim 9, wherein the mobile terminal is an LTE mobile terminal.

* * * * *